United States Patent
Wambach et al.

(10) Patent No.: US 6,330,648 B1
(45) Date of Patent: Dec. 11, 2001

(54) COMPUTER MEMORY WITH ANTI-VIRUS AND ANTI-OVERWRITE PROTECTION APPARATUS

(76) Inventors: Mark L. Wambach, 20 Gateway Rd.; Mark Corio, 37 Bucky Dr., both of Rochester, NY (US) 14624

( * ) Notice: Subject to any disclaimer, the term of this patent is extended or adjusted under 35 U.S.C. 154(b) by 0 days.

(21) Appl. No.: 08/652,653

(22) Filed: May 28, 1996

(51) Int. Cl.[7] .................................................. G06F 12/14
(52) U.S. Cl. ........................ 711/163; 711/154; 711/164
(58) Field of Search .................................... 711/163, 164, 711/154; 380/4, 5

(56) References Cited

U.S. PATENT DOCUMENTS

| | | | | |
|---|---|---|---|---|
| 4,388,695 | * | 6/1983 | Heinemann | 364/900 |
| 4,701,846 | * | 10/1987 | Ikeda et al. | 711/163 |
| 5,022,077 | * | 6/1991 | Bealkowski et al. | 380/4 |
| 5,027,317 | * | 6/1991 | Pepera et al. | 711/163 |
| 5,067,077 | * | 11/1991 | Wakimoto et al. | 711/163 |
| 5,155,829 | * | 10/1992 | Koo | 711/163 |
| 5,421,006 | * | 5/1995 | Jablon et al. | 395/575 |
| 5,564,036 | * | 10/1996 | Sugai | 395/479 |
| 5,586,301 | * | 12/1996 | Fisherman et al. | 395/479 |
| 5,657,475 | * | 8/1997 | Gillespie et al. | 395/490 |
| 5,802,591 | * | 9/1998 | Yachida | 711/164 |

\* cited by examiner

Primary Examiner—Tuan V. Thai
(74) Attorney, Agent, or Firm—Michaelson & Wallace

(57) ABSTRACT

The invention is embodied in a computer including a memory and a memory protector responsive to a list of key memory locations containing information to be protected, the memory protector including (a) a write protection circuit—operating independently of the computer—which prevents any write requests specifying the memory locations contained in the list from being carried out, and (b) a manual protect enable switch for enabling and temporarily disabling the write protection circuit, thus allowing special or temporary access to the protected memory locations. The write protection circuit may be implemented as a programmed microprocessor with its program stored in a non-volatile read-only memory, or as a dedicated hard-wired logic circuit, such as a field programmable gate array. The list of key memory locations may be stored in a non-volatile memory accessed by the write protection circuit. More conveniently, the list is contained in a protected memory location (i.e., a memory location specified on the list itself), the list being downloaded to the write protection circuit.

23 Claims, 5 Drawing Sheets

COMPUTER MEMORY WITH ANTI-VIRUS AND ANTI-OVERWRITE PROTECTION APPARATUS

BACKGROUND OF THE INVENTION

1. Technical Field

The invention is related to the protection of computer mass memories such as magnetic hard disk drives, optical disk drives and the like, and in particular to apparatus for protecting key sectors of such memories from accidental or unauthorized overwriting.

2. Background Art

A computer is vulnerable to accidental or unauthorized overwriting or erasure of portions of its mass memory containing key programs such as the operating system, for example, or containing important archival storage such as accounting information, for example. Unauthorized overwriting can occur when a computer virus somehow enters the computer in the form of a clever program that gets stored in the mass memory and which contains instructions causing the computer to overwrite such key portions of its mass memory. If, for example, a portion of the mass memory containing the operating system is overwritten because of such a virus, the computer does not function the next time it is powered up. If portions of the mass memory containing application programs are overwritten, such programs will not run properly. Accidental or unauthorized overwriting of the mass memory can also occur by accidental formatting of the hard drive or by erasing sector zero of the mass memory including the file allocation table.

An object of the present invention is to provide a computer which is impervious to unauthorized (intentional) or accidental overwriting of key sectors of its mass memory. A related object of the invention is that the computer be impervious to such unauthorized or accidental overwriting of key mass memory sectors even in the presence of an active computer virus in the mass memory.

SUMMARY OF THE DISCLOSURE

The invention is embodied in a computer including a mass memory and a memory protector responsive to a list of key mass memory locations containing information to be protected, the memory protector including (a) a write protection circuit—operating independently of the computer—which prevents any write requests specifying the mass memory locations contained in the list from being carried out, and (b) a user-controlled protect enable switch for enabling and temporarily disabling the write protection circuit, thus allowing special or temporary access to the protected mass memory locations. The write protection circuit may be implemented as a programmed microprocessor with its program stored in a non-volatile read-only memory, or as a dedicated hard-wired logic circuit, such as a field programmable gate array. The list of key mass memory locations may be stored in a non-volatile memory accessed by the write protection circuit. More conveniently, the list is contained in a protected mass memory location (i.e., a mass memory location specified on the list itself), the list being downloaded to the write protection circuit as required. For example, it may be downloaded at system power-up, or each time the user-controlled protect enable switch is moved to its enable position or each time the media is changed (for example, if the mass memory is a removable media disk drive).

However, in the preferred embodiment, no list of protected mass memory locations is required. Instead, each protected mass memory location (e.g., a particular sector on a disk drive) has a particular bit (hereinafter referred to as a "sector bit") which is always protected by the protection circuit. The protection circuit always senses the value of the protected sector bit before permitting any writing to that sector. If the sector bit is of a certain "flag" value (e.g., binary 1 ), then the protection circuit 160 prevents any writing to that sector. Otherwise, if the sector bit is not set to the "flag" value (e.g., if the sector bit is binary 0), then the protection circuit permits that sector to be written to. The sector bit may only be changed if the protection circuit has been disabled by the user exercising the switch. An advantage of this embodiment is that a complete list of addresses of protected mass memory locations need not be maintained and periodically accessed or downloaded for the protection circuit.

The designation or list of protected mass memory locations may be modified only by first toggling the protect enable switch. In the embodiments in which a list of all protected mass memory locations is stored in a known protected memory location (either on a PROM chip or on the mass memory itself), toggling of the switch at least temporarily disables the protect circuit to allow writing to the mass memory location (or PROM location) containing the list. Since the protect enable switch is controlled by an external entity (either the user or a remote controller, device or computer), it is not susceptible to tampering by a computer virus which has entered the mass memory of the host computer. Since the write protection circuit is independent of the host computer, it does not respond to and is not changed by instructions stored in the computer's mass memory, and therefore is not susceptible to tampering by a computer virus stored in the mass memory.

In a first embodiment, the write protection circuit and the manual protect enable switch are part of the mass memory (e.g., the hard drive) itself. In a second embodiment, the write protection circuit and the manual protect enable switch are at a remote location such as an interface card normally installed between the computer and the mass memory or in a separate card in-line with the interface card. In the second embodiment, the write protection circuit responds to a request to write to a protected mass memory location by causing an illegal command to be sent to the mass memory, causing the mass memory to abort the write operation and issue an error signal back to the computer. In either the first or second embodiment, the list can be stored either in a non-volatile memory accessed by the write protection circuit or in a protected location of the computer's mass memory, as stated above. The first embodiment is suited for using a protected sector bit in each sector to label the sector as "protected" or "unprotected".

If the list of protected mass memory locations is stored in a non-volatile memory accessed by the write protection circuit, the non-volatile memory optionally may be programmable through the host computer for the sake of convenience. However, in this case overwriting of the non-volatile memory containing the list of protected mass memory locations is preferably prevented whenever the protect enable manual switch is in its enable position. In this way the non-volatile memory enjoys the same status as the protected sectors of the host computer's mass memory. In another embodiment, the non-volatile memory storing the list of protected mass memory locations is not accessible to the host computer.

There are several advantages to storing the list of protected mass memory locations in the mass memory itself or always protecting a sector bit in each sector designating that sector as protected or unprotected. One is that minimal reconfiguration of existing mass memory systems is required to carry out the invention. Another is that memories with removable media can have different patterns of protected memory locations for different removable disks up to any number of removable disks for a given disk drive.

Another feature of the invention is a time-out feature in which the disable mode of the manual protect enable switch is effective for a limited time only, so that inadvertent or intentional tampering with the switch is not possible. Such a feature is built into the write protection circuit or the program it carries out.

DETAILED DESCRIPTION OF THE PREFERRED EMBODIMENTS

Figure 1:
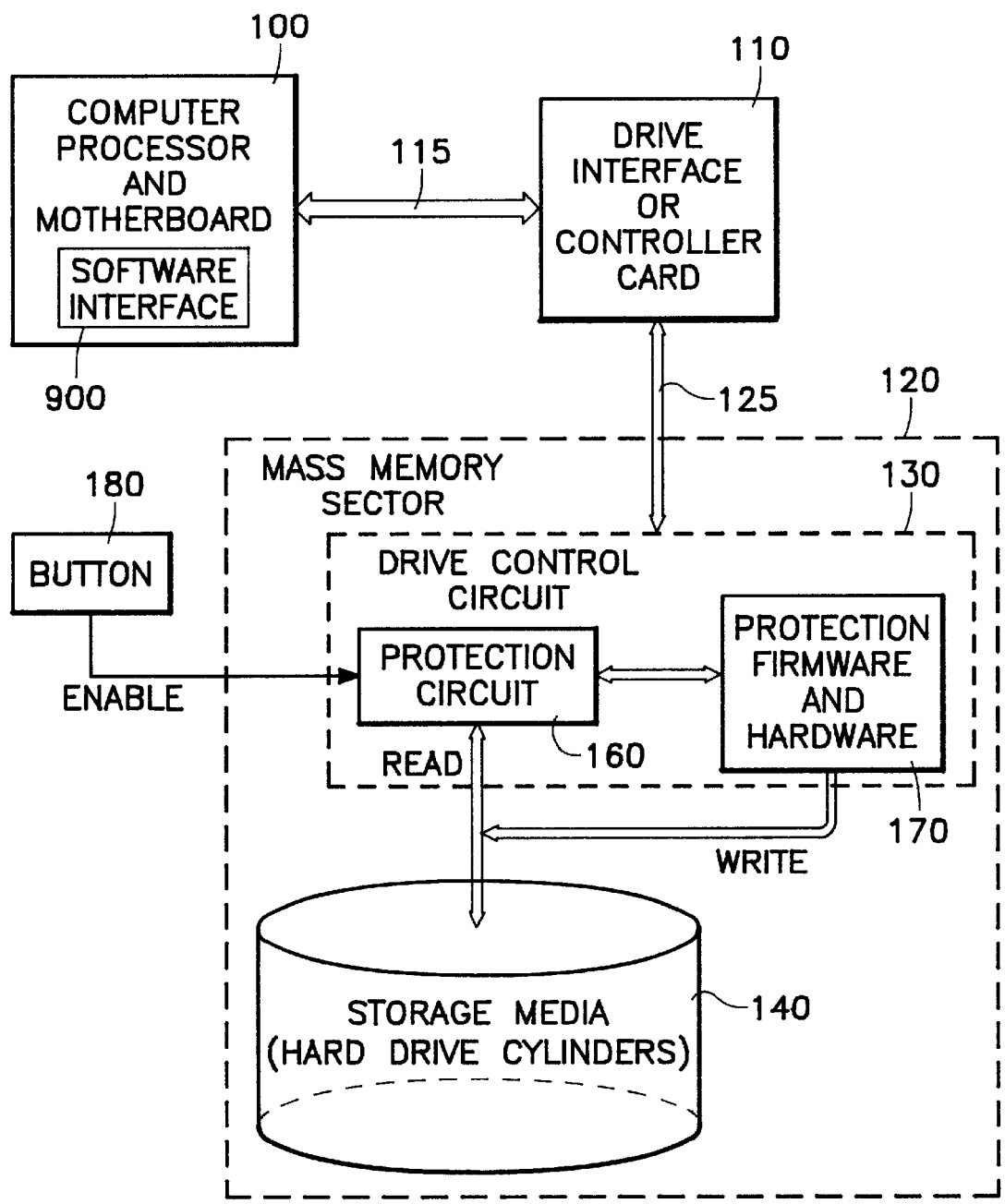
FIG. 1 is a schematic block diagram of a first embodiment of the invention having a write protection processor resident in the mass memory itself.

Referring to FIG. 1, a computer system such as a personal computer or a work station, for example includes a host computer 100 having a microprocessor and motherboard, a drive interface or controller card 110 connected to the host computer 100 by a bus 115 and a mass memory 120, such as a magnetic hard drive, connected to the controller card 115 by a bus 125. The mass memory 120 may be any type such as a magnetic hard disk drive, a read/write compact disk (CD) drive, a magneto-optical drive, a removable disk drive or an optical disk drive. The interface protocol carried out between the host computer 100, the controller card 110 and the mass memory 120 may be any industry standard interface protocol such as IDE, SCSI, SSA or future interface protocols such as IEEE 1394, for example.

The mass memory 120 includes a internal drive control circuitry 130 and the storage media 140 controlled by the internal drive control circuitry. If the mass memory 120 is a magnetic or optical disk drive then the storage media 140 is a stack of magnetic or optical disks, respectively. Certain software key to the operation of the host computer 100 (such as the operating system) or certain irreplaceable data (such as accounting data, for example) is stored in known sectors or mass memory locations in the mass memory 120. In order to prevent inadvertent erasure of such mass memory locations or intentional sabotage of them (as by a computer virus), a first embodiment of the invention provides a write protection circuit 160 in the form of either a microprocessor including a programmed read-only memory or a dedicated hard-wired logic circuit such as a programmable gate array. The circuit 160 is programmed (if a microprocessor) or configured (if a gate array) to carry out a write protection function by preventing any attempts to write or change data already stored in mass memory locations specified in a list as "protected" mass memory locations. The list may be stored in protection firmware and hardware 170 accessed by the write protection circuit 160 or it may be stored in one of the mass memory locations specified on the list itself. If the write protection circuit 160 is a microprocessor, then the protection firmware and hardware 170 may store the program which the circuit 160 carries out in performing the write protection function described here. The generation of such a program is carried out by the skilled worker in this field as a trivial exercise in view of the disclosure of this specification.

Basically, the write protection function carried out by the write protection circuit or microprocessor 160 is to compare the mass memory address specified in each write request received from the host computer 100 with the list of protected mass memory locations. If it finds a match, the processor 160 causes the write operation to be aborted and an error signal to be sent from the mass memory 120 back through the interface card 110 to the host computer 100. Otherwise, the processor 160 does not interfere with the write operation. In the case of a legal write request (i.e., a write request not specifying a protected mass memory location), the protection firmware and hardware 170 passes along the write request from the host computer 100 to the internal drive control circuitry 130. The write protection circuit 160 does not interfere with read requests from the host computer 100 so that the write protection circuit 160 and its associated firmware and hardware 170 are transparent to mass memory read operations.

In order to permit the host computer user to update or modify key contents of the mass memory 120, for example to upgrade the operating system or to modify archival data, a write protect enable switch 180 controlling the write protect circuit 160 is provided which, when exercised, temporarily disables the write protection function of the write protection circuit 160 to permit temporary writing to the protected mass memory locations specified in the list. For example, the write protect circuit 160 can have a one-bit control input. The write protect circuit may either respond to any change in the binary value (either from 1 to 0 or from 0 to 1) to disable itself, preferably for a temporary predetermined time period, or, less preferably, disables itself for as long as the binary value is of a certain value (e.g., 1). Alternatively, the switch 180 itself could have a time-out feature built into it so that, upon being exercised or toggled, it changes the binary value to the disable state (e.g., 1) for a temporary time period and then automatically returns the binary value to enable state (e.g., 0). Preferably, the switch 180 is a manual button and must be manually exercised by the user so that no computer virus can circumvent the write protect enable button 180. However, the switch 180 may be electronically activated. In this case, any external device can control the switch 180 through an electronic, electrical or optical link. For example, the switch 180 may be controlled via a communication link (either optical link or a telephone line/modem, for example) by a remote master computer in a network of computers. Or, the switch 180 may be controlled by any other remote device such as a personal communication device. The most simple remote electronic control of the switch could be achieved by employing a hand-held infrared transmitter, the switch 180 including an infrared receiver in this case. Preferably, the protection firmware and hardware 170 (rather than the switch 180) includes a time-out feature which limits the time window during which the write protection function of the write protection circuit 160 is disabled after the button 180 has been exercised. As a further option, a secure user ID code may be required to be entered into the host computer keyboard (for example) before the button 180 can disable the write protection function.

As another convenient option, whenever the button 180 is exercised by the user, the host computer 100 is allowed to write not only to the protected locations in the mass memory 120 but also to memory locations in the protection firmware and hardware 170. Such memory locations in the protection firmware and hardware 170 may store the list of protected locations in the mass memory 120, in one embodiment. Thus, under access controlled by the manual button 180, the user can conveniently alter the list of protected mass memory locations and/or alter the data stored in those locations.

In some cases, it may be possible to implement the functions of FIG. 1 using existing components in the disk drive, thereby requiring few or no hardware changes to the disk drive in carrying out the invention.

In the preferred embodiment, no list of protected mass memory locations is required. Instead, each protected mass memory location (e.g., a particular sector on the mass memory or disk drive 120) has a particular bit (hereinafter referred to as a "sector bit") which is always protected by the protection circuit 160. The protection circuit 160 always senses the value of the protected sector bit before permitting any writing to that sector. If the sector bit is of a certain "flag" value (e.g., binary 1), then the protection circuit 160 prevents any writing to that sector. Otherwise, if the sector bit is not set to the "flag" value (e.g., if the sector bit is binary 0), then the protection circuit 160 permits that sector to be written to by the host computer 100. The sector bit may only be changed if the protection circuit 160 has been disabled by the user exercising the switch 180. An advantage of this embodiment is that a complete list of addresses of protected mass memory locations need not be maintained and periodically accessed or downloaded for the protection circuit 160. The only requirement is that the protection circuit 160 be programmed to do two things: (a) prevent writing to the location of the sector bit of each sector (except when the switch 180 disables the protection circuit 160), and (b) prevent writing to any portion of the entire sector if its sector bit is set to the "flag" or "protect" value (except when the switch 180 disables the protection circuit 160).

Figure 2:
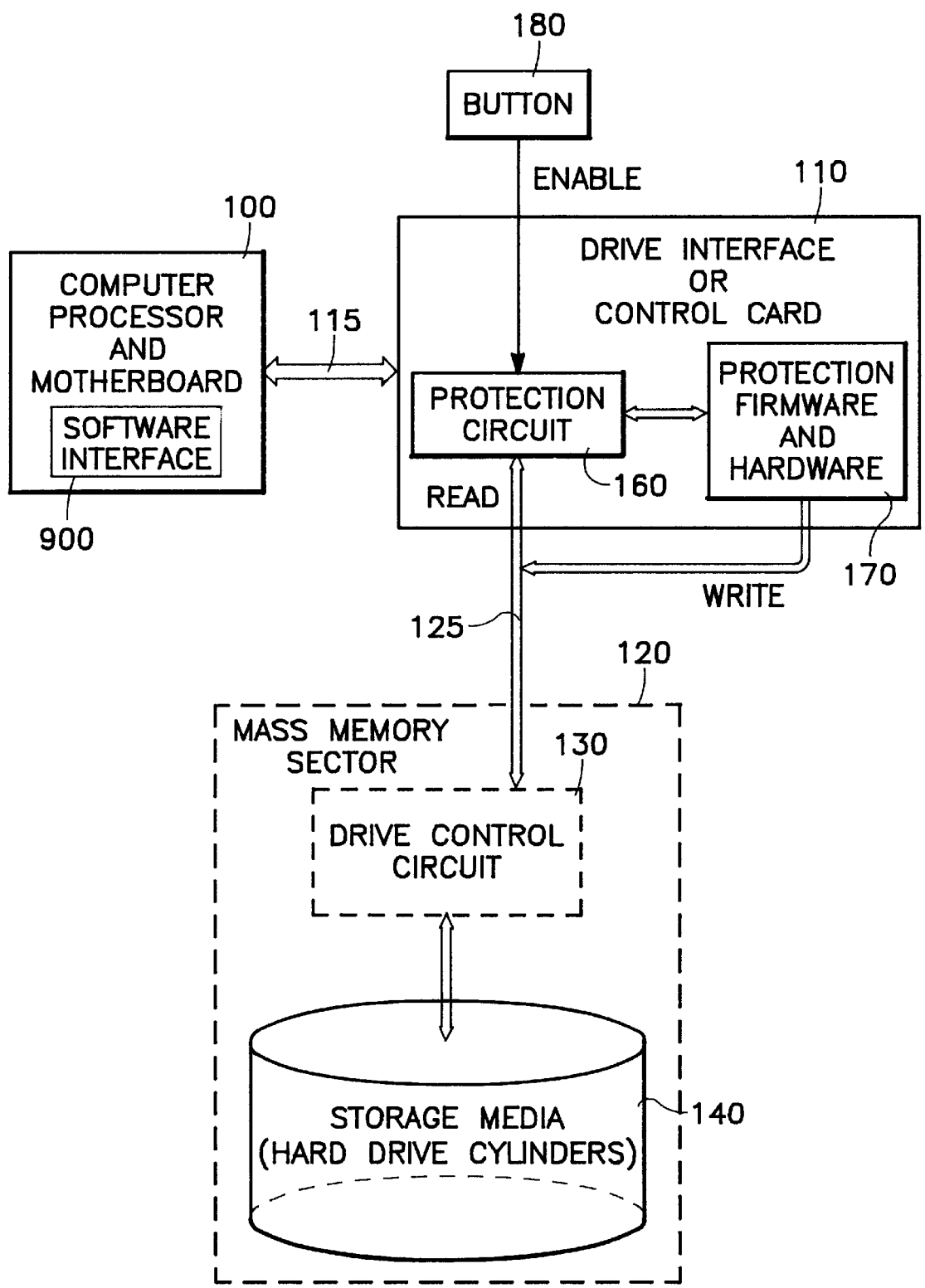
FIG. 2 is a schematic block diagram of a second embodiment of the invention having a write protection processor resident in interface between the host computer and the mass memory.

FIG. 2 illustrates another embodiment of the invention in which the write protection circuit 160, the write protection firmware and hardware 170 and the protect enable button 180 are located remotely from the mass memory 120 but in-line in the data flow between the host computer 100 and the mass memory 120. In the example of FIG. 2, the write protection circuit 160, the write protection firmware and hardware 170 and the protect enable button 180 are all located on the interface card 110 although they may be located separately from the interface card 110. One advantage of locating them on the interface card is that in some cases the write protection circuit 160 may be implemented using circuits or hardware already present on the interface card 110.

In accordance with a preferred feature of the embodiment of FIG. 2, in order to abort a request from the host computer 100 to write in a protected mass memory location, the protection firmware and hardware 170 in the embodiment of FIG. 2 preferably transmits to the internal drive control circuitry 130 of the mass memory 120 an illegal command (in lieu of the write request from the host computer 100). Such an illegal command causes the internal drive control circuitry 130 to abort the write process and return an error message. In the case of a legal write request (i.e., a write request not specifying a protected mass memory location), the protection firmware and hardware 170 passes along the write request from the host computer 100 to the internal drive control circuitry 130. The advantage of this feature is that it requires no modification of the disk drive 120 itself in carrying out the invention. The write protection circuit 160 does not interfere with read requests from the host computer 100 so that the write protection circuit 160 and its associated firmware and hardware 170 are transparent to mass memory read operations.

Figure 3:
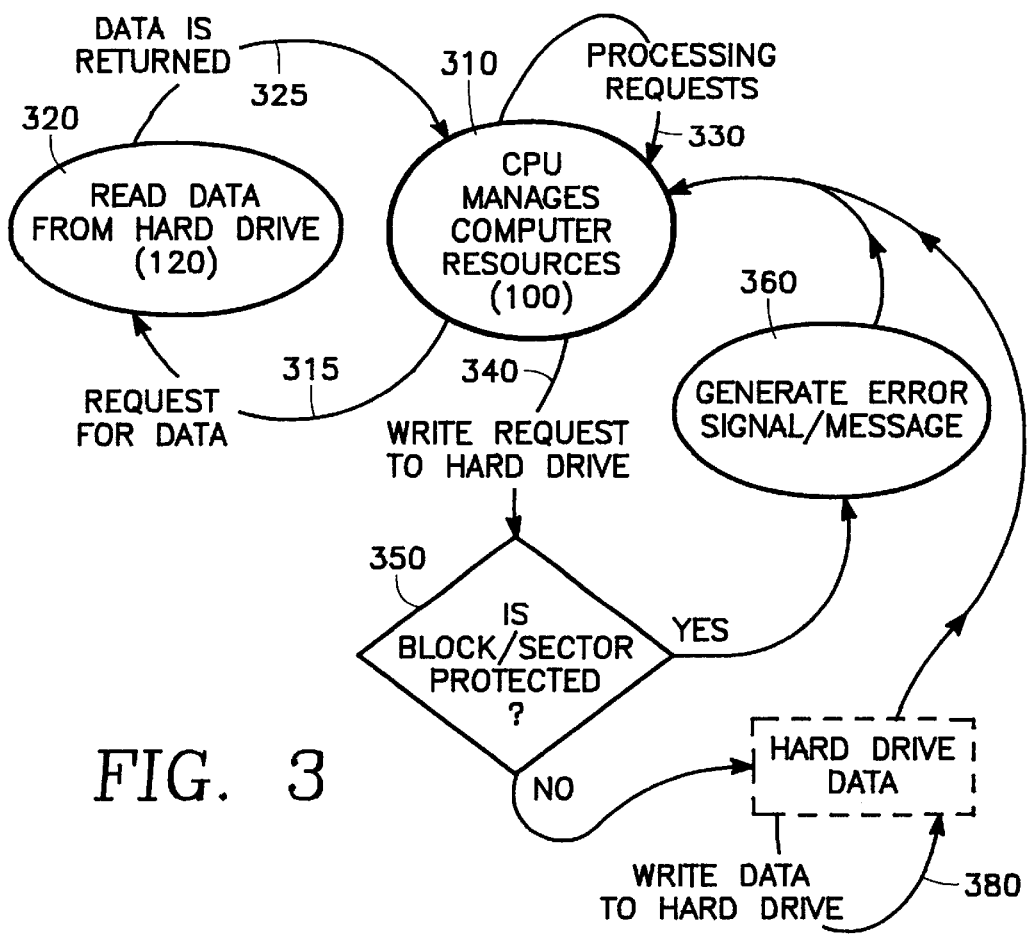
FIG. 3 is a flow diagram illustrating how the invention operates in its protected mode.

Referring to FIG. 3, when the write protection circuit 160 is not disabled by the button 180, the central processing unit (CPU) of the host computer 100 manages computer resources (block 310 of FIG. 3), sending requests for data 315 to read data from the mass memory 120 (block 320 of FIG. 3) and receives data 325 back from the mass memory 120. In the meantime the CPU processes requests from other sources (330). If a write request 340 is issued by the CPU, then the write protection circuit 160 determines whether it involves protected mass memory locations (block 350 of FIG. 3). If so (YES branch of block 350), then the write protection circuit 160 causes an error message 360 to be returned to the host computer 100. Otherwise (NO branch of block 350), the data is written to the hard drive (at 380 of FIG. 3).

Figure 4:
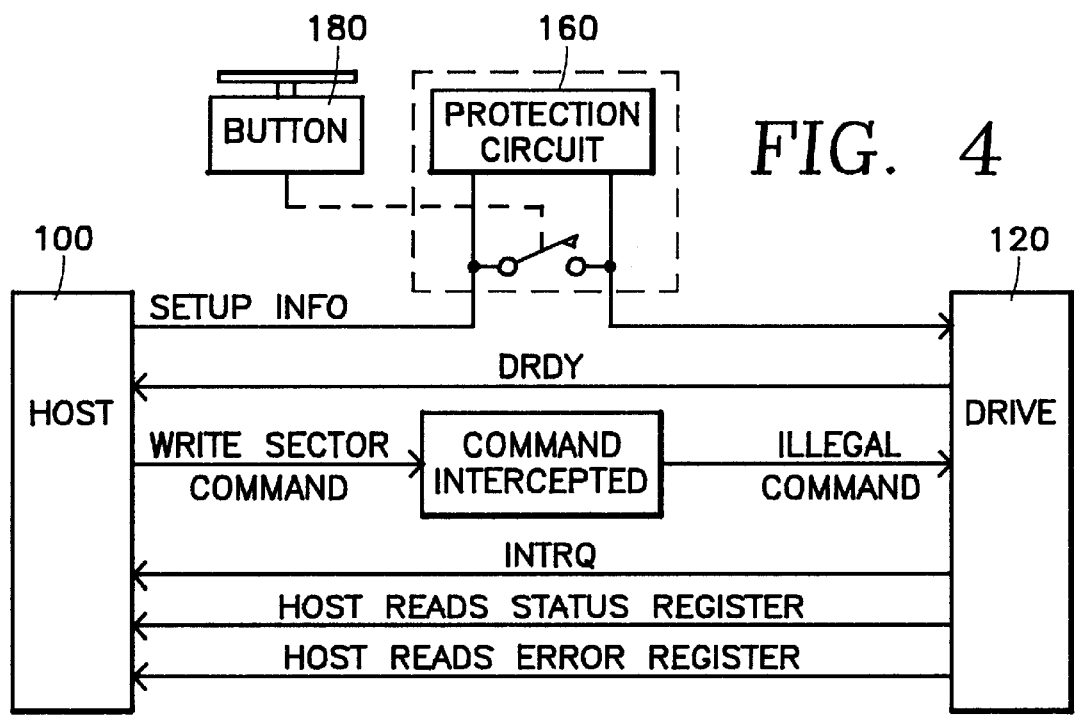
FIG. 4 is a diagram illustrating how the protected mode of FIG. 3 is carried out in the embodiment of FIG. 2 employing an IDE bus protocol in response to an attempt to overwrite a protected mass memory sector.

FIG. 4 illustrates the sequence of signals transmitted between the host computer 100 and the mass memory 120 of FIG. 2 where an IDE interface protocol is employed to carry out the process of FIG. 3. FIG. 4 illustrates the case in which a write request is received specifying a protected mass memory location using the standard IDE protocol signals. The process illustrated in FIG. 4 is as follows:

The host computer 100 writes setup information (sector address, etc.) to the mass memory or disk drive 120. The protection circuit 160 monitors this setup information to determine if the sector address is currently protected.

The disk drive 120 indicates that it is ready for a command by setting the drive ready bit (DRDY) in the status register.

The host computer 100 sends the write sector command. If the sector address is monitored above indicates a protected sector, this command is intercepted by the protection circuitry and a dummy command (i.e. unused illegal command) is sent to the disk drive unit 120. This illegal command will cause the disk drive 120 to abort the process and issue an error.

The drive clears BSY and drives the interrupt request bus signal line (INTRQ) active to indicate that the host should read the status register.

The host reads the error bit in the status register.

If the disk drive 120 detects an error condition (e.g. illegal command from the host) it will abort the process, set the error bit in the status register and assert INTRQ to let the host computer 120 know that it should read the status register. The drive also places an error code in the error register to indicate what type of error was encountered.

Figure 5:
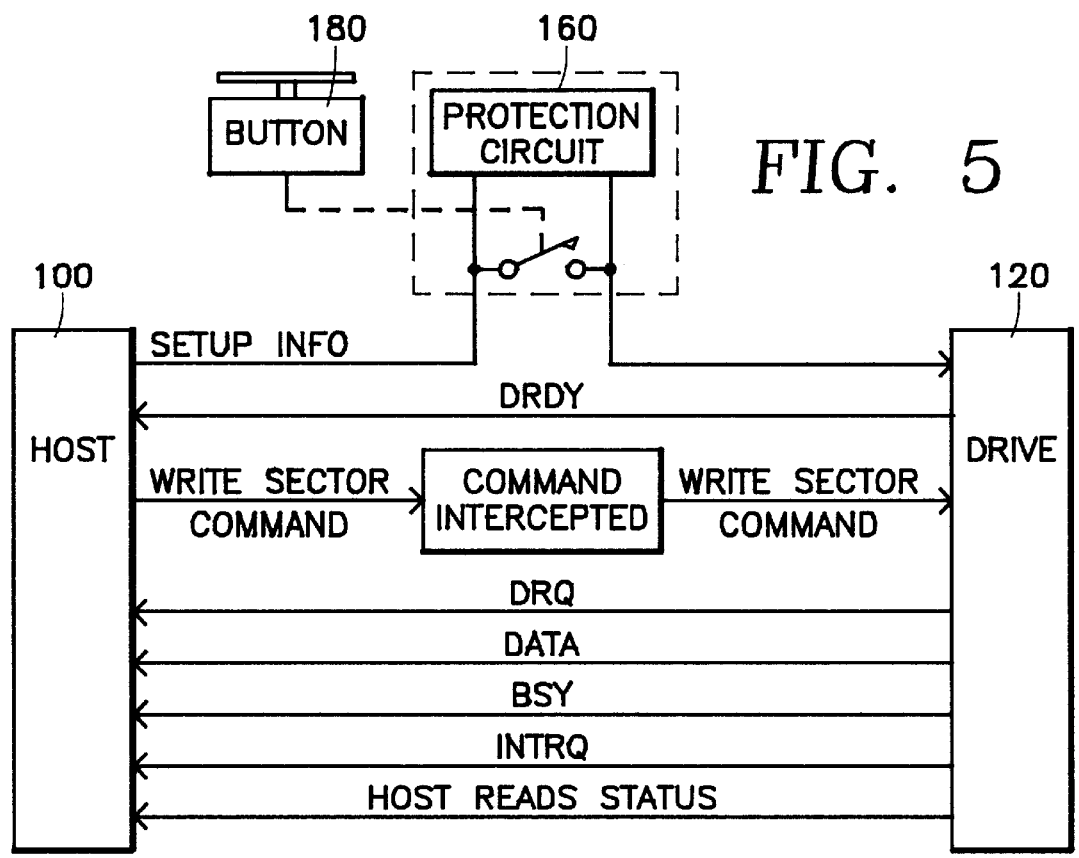
FIG. 5 is a diagram illustrating how the protected mode of FIG. 3 is carried out in the embodiment of FIG. 2 employing an IDE bus protocol in response to an attempt to overwrite an un-protected mass memory sector.

FIG. 5 illustrates the sequence of signals transmitted between the host computer 100 and the mass memory 120 of FIG. 2 where an IDE interface protocol is employed to carry out the process of FIG. 3. FIG. 5 illustrates the case in which a write request is received specifying an unprotected mass memory location using the standard IDE protocol signals. The process illustrated in FIG. 5 is as follows:

The host computer 100 writes setup information (sector address, etc.) to the drive. The protection circuit 160 monitors this setup information to determine if the sector address is currently protected.

The disk drive 120 indicates that it is ready for a command by setting the drive ready bit (DRDY) in the status register.

The host computer 100 sends the write sector command. If the sector address as monitored above does not indicate a protected sector, this command is intercepted by the protection circuit 160 but is passed along intact to the internal control circuit 130 of the disk drive 120 so that the write sequence continues normally.

The disk drive 120 sets the data request bit (DRQ) in the status register.

The host computer 120 sends the data to be written to the drive a byte at a time and the drive stores this data in the sector buffer.

The disk drive 120 resets DRQ and sets the busy bit (BSY) in the status register.

The disk drive 120 writes the data in the sector buffer to the media.

The disk drive 120 clears BSY and drives the interrupt request bus signal line (INTRQ) active to indicate that the host computer 100 should read the status register.

The host computer 100 reads the status register.

The disk drive 120 de-asserts INTRQ.

Figure 6:
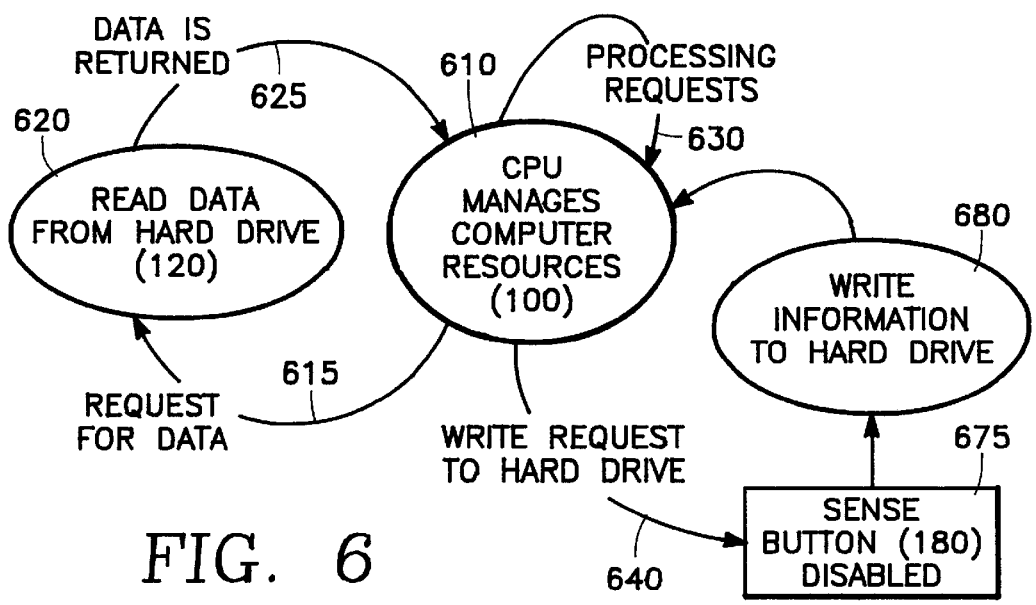
FIG. 6 is a flow diagram illustrating how the invention operates in its unprotected mode.

Referring to FIG. 6, when the write protection circuit 160 has been temporarily disabled by the button 180, the central processing unit (CPU) of the host computer 100 manages computer resources (block 610 of FIG. 3), sending requests for data 615 to read data from the mass memory 120 (block 620 of FIG. 3) and receives data 625 back from the mass memory 120. In the meantime the CPU processes requests from other sources (630). If a write request 640 is issued by the CPU, the write protection circuit 160 senses that it has been placed in a quiescent state by the button 180 (block 675 of FIG. 6) and the data is written to the hard drive (at 680 of FIG. 3).

Figure 7:
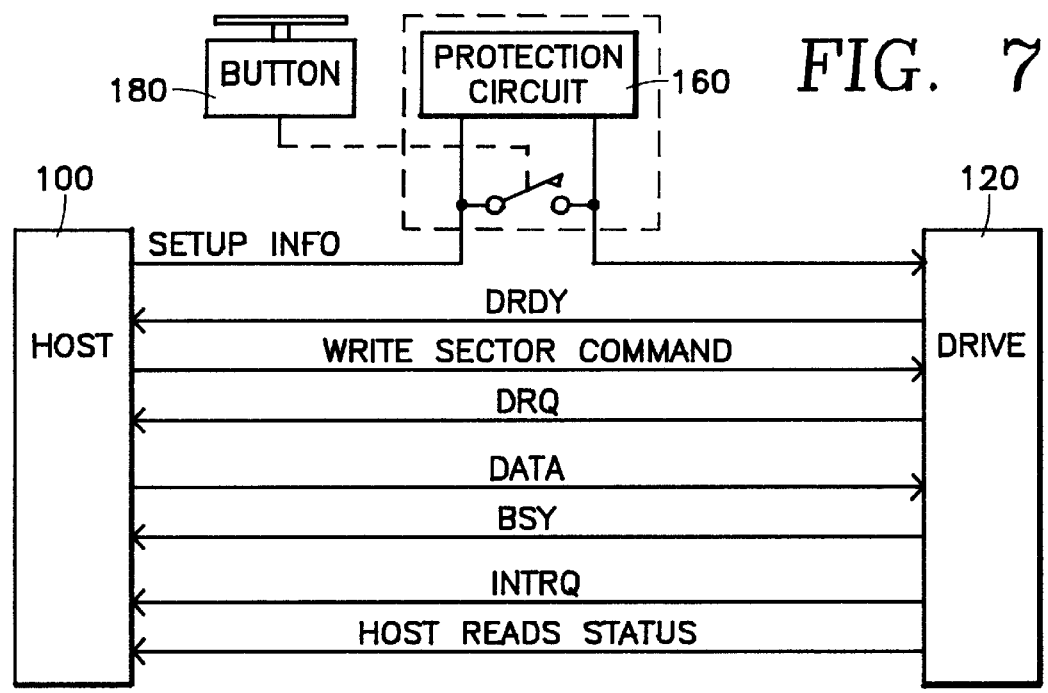
FIG. 7 is a diagram illustrating how the unprotected mode of FIG. 6 is carried out in the embodiment of FIG. 2

FIG. 7 illustrates the sequence of signals transmitted between the host computer 100 and the mass memory 120 of FIG. 2 where an IDE interface protocol is employed to carry out the process of FIG. 6 using the standard IDE protocol signals. The process illustrated in FIG. 5 is as follows:

The host computer 100 writes setup information (sector address, etc.) to the drive. The protection circuit 160 does not monitor this setup information since the button 180 has been exercised to disable the protection circuit 160.

The disk drive 120 indicates that it is ready for a command by setting the drive ready bit (DRDY) in the status register.

The host computer 100 sends the write sector command. This command is not intercepted by the protection circuit 160 because the button 180 has been exercised to disable the protection circuit 160 so that the command is send directly to the internal control circuit 130 of the disk drive 120 and the write sequence continues normally.

The disk drive 120 sets the data request bit (DRQ) in the status register.

The host computer 120 sends the data to be written to the drive a byte at a time and the drive stores this data in the sector buffer.

The disk drive 120 resets DRQ and sets the busy bit (BSY) in the status register.

The disk drive 120 writes the data in the sector buffer to the media.

The disk drive 120 clears BSY and drives the interrupt request bus signal line (INTRQ) active to indicate that the host computer 100 should read the status register.

The host computer 100 reads the status register.

The invention may further include in the host computer 100 a software interface 900 which permits the user to specify the names of files in the mass memory which are to be protected. The software interface would then search the mass memory directory to automatically determine all of the mass memory locations where a particular file or portions thereof are stored. The software interface would then transmit the addresses of the corresponding mass memory locations to the memory locations at which the list of protected memory locations is stored. Since these memory locations cannot be altered without authorization through the button 160, the software interface would further include a feature which holds the mass memory addresses determined from the user's designated file names until such time as the button 160 is activated to authorize access to those protected mass memory locations storing the list of all protected mass memory locations. The advantage of the software interface 900 is that the user is not required to know the locations in mass memory at which a particular file is stored. Thus, for example, if the user wishes to protect the operating system on the host computer 100, he merely invokes the software interface 900 and enters the file names of the operating system to the software interface 900. The software interface 900 can prompt the user to exercise the protect enable button 180 to permit the software interface 900 to add the corresponding mass memory locations to the list of protected locations. The software interface can further prompt the user to first run a computer-virus detection software package on the host computer 100 before exercising the button 180. Finally, the software interface 900 preferably includes a function which prevents altering the list of protected mass memory locations (or altering the sector bits in the preferred embodiment) unless the user has entered a predetermined security code. In one implementation, the security code itself can be stored in a protected mass memory location and the software interface 900 compares the code entered by the user with the security code (or codes) stored in the protected memory location set aside for storing such codes. Unless a match is found in this comparison, the software interface 900 prevents any change to the list of protected mass memory locations or, in the preferred embodiment, prevents altering of the sector bits.

Figure 8:
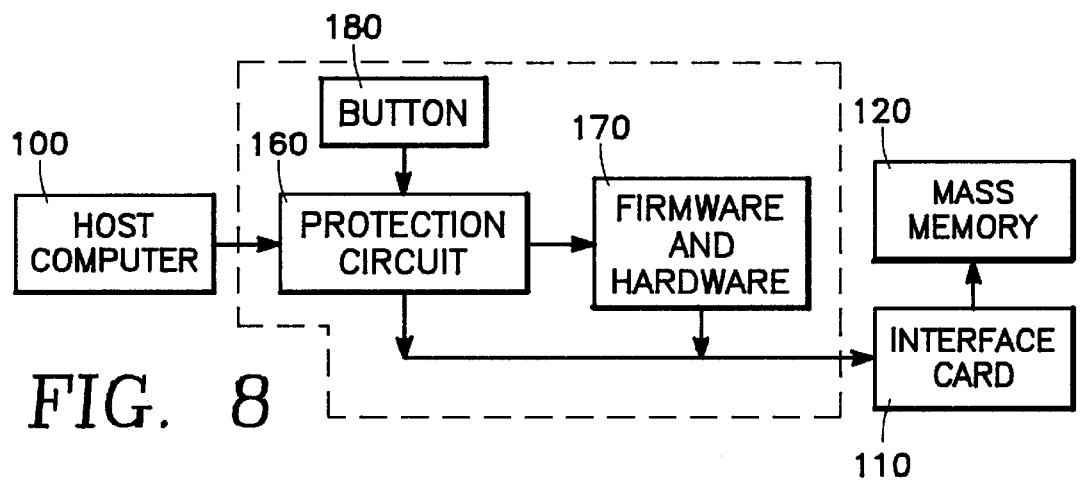
FIG. 8 is a schematic block diagram illustrating another alternative embodiment of the invention.
Figure 9:
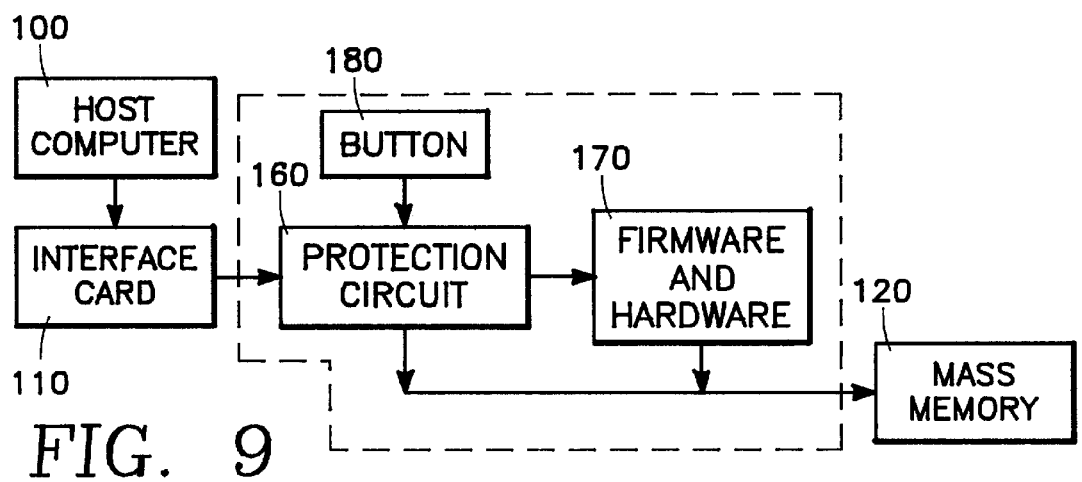
FIG. 9 is a schematic block diagram illustrating yet another alternative embodiment of the invention.

Referring to the alternative embodiment of FIG. 8, the write protection circuit 160, the protection firmware and hardware 170 and the button 180 may be installed on a separate card in-line between the host computer 100 and the interface controller 110. Referring to the alternative embodiment of FIG. 9, the write protection circuit 160, the protection firmware and hardware 170 and the button 180 may be installed on a separate card in-line between the interface controller 110 and the mass memory or disk drive 120.

While the invention has been described in detail by specific reference to particular apparatus not accessible to a virus that may have entered the host computer for performing the write protect function including a manual button for temporarily disabling the write protect function, the invention is more generally a method implemented in any suitable apparatus of storing a list of mass memory locations to be protected in a protected storage and preventing any overwriting of those locations except for temporary periods of time when manually prompted by the user. The prevention of such overwriting is carried out in a processor independent of the host computer, so that no virus in the host computer can interfere with the write protection function.

While the invention has been described in detail by specific reference to preferred embodiments, it is understood that variations and modifications thereof may be made without departing from the true spirit and scope of the invention.

What is claimed is:

1. A method of protecting selected locations in a computer mass memory from overwriting by a host computer, said host computer adapted to send write requests specifying memory locations to said memory, said method comprising:
    designating in a location not write-accessible by said host computer selected memory locations of said computer mass memory to be protected;
    comparing in a circuit independent of said host computer write requests from said host computer with the designation of the memory locations to be protected, and blocking such write requests for which a match is found in the comparison; and
    refraining from said blocking in response to a prompt external of said host computer, so as to permit manually controlled access to said protected memory locations.

2. The method of claim 1 wherein said designating comprises:
    (a) dividing said memory into sectors and protecting a predetermined portion of each sector from being written to except during said refraining;
    (b) setting said predetermined portion of each memory location to be protected to a flag value during said refraining.

3. The method of claim 1 wherein said designating comprises:
    storing a list of all memory locations to be protected either (a) some of said protected memory locations in said memory or (b) another storage device not freely accessible by said host computer, and downloading said list for access by said circuit.

4. The method of claim 1 wherein said refraining is carried out for a predetermined temporary period of time.

5. The method of claim 1 wherein said blocking is carried out externally of said memory and comprises sending an illegal command to said memory to cause said memory to abort said write request and return an error message to said host computer.

6. The method of claim 1 wherein said blocking is carried out by circuitry within said memory.

7. The method of claim 1 wherein said prompt comprises a signal received from a manual button exercised by said user.

8. The method of claim 3 wherein said independent storage location is alterable by said host computer only upon said manual prompt by said user.

9. The method of claim 2 wherein said memory comprises a removable media memory adapted to receive any one of a plurality of removable media, and wherein said storing step comprises storing a list of protected memory locations on each of said plurality of removable media.

10. The method of claim 5 wherein said blocking is carried out in a memory interface circuit interposed between said host computer and said memory.

11. A computer memory system for access by a host computer through write requests from said host computer specifying particular memory locations to be written, said computer memory system comprising:
    a mass memory data storage medium;
    a list in a location not write accessible by said host computer of memory locations of said mass memory data storage medium which are to be protected from writing;
    a protection circuit independent of said host computer for preventing the execution of memory write requests from said host computer involving at least one of said protected memory locations; and
    a switch for disabling said protection circuit.

12. The computer of claim 11 wherein said list is stored in at least one of said protected memory locations.

13. The computer memory system of claim 11 further comprising a memory circuit connected to said protection circuit, said list being stored in said memory circuit.

14. The computer memory system of claim 11 wherein said computer memory comprises an internal memory control circuit for controlling said storage medium and for interfacing with said host computer through an external interface circuit, and wherein said protection circuit comprises a circuit in said internal memory control circuit.

15. The computer memory system of claim 11 wherein said computer memory comprises an internal memory control circuit for controlling said storage medium and for interfacing with said host computer through an external interface circuit, and wherein said protection circuit comprises a circuit external of said internal memory control circuit.

16. The computer memory system of claim 15 wherein said protection circuit comprises a circuit in said external interface circuit.

17. The computer memory system of claim 11 wherein said protection circuit is disabled by said switch for a temporary period of time.

18. The computer memory system of claim 11 further comprising a read-only memory connected to said protection circuit and storing instructions for preventing the execution of memory write requests from said host computer involving at least one of said protected memory locations and for permitting the disabling of said protection circuit by said switch.

19. The computer system of claim 18 wherein said protection circuit executes said instructions stored in said read-only memory independently of said host computer so as to be immune from any virus in said host computer.

20. The computer system of claim 18 further comprising a software interface in said host computer for generating said list from file names identified by said user.

21. The computer system of claim 20 wherein said software interface comprises means for writing said list to a protected storage location where said list is to be kept.

22. The computer system of claim 21 wherein said software interface comprises a security feature for blocking said writing of said list until receipt of an authorized security code.

23. The computer memory system of claim 12 wherein said means for storing comprises a sector bit in each sector of said data storage medium whose value designates whether the correspondence sector is a protected memory location.

* * * * *